(12) United States Patent
Kinnunen

(10) Patent No.: US 6,687,517 B2
(45) Date of Patent: Feb. 3, 2004

(54) HANDS-FREE OPERATION OF MOBILE TERMINAL USING WIRELESS COMMUNICATION LINK

(75) Inventor: Jan Kinnunen, Ypäjä (FI)

(73) Assignee: Nokia Corporation, Espoo (FI)

( * ) Notice: Subject to any disclaimer, the term of this patent is extended or adjusted under 35 U.S.C. 154(b) by 401 days.

(21) Appl. No.: 09/855,672

(22) Filed: May 16, 2001

(65) Prior Publication Data

US 2002/0173347 A1 Nov. 21, 2002

(51) Int. Cl.[7] .............................. H04B 1/38; H04M 1/00
(52) U.S. Cl. ................... 455/569.1; 455/569.2; 455/575.2; 455/41.2; 340/686.6
(58) Field of Search ..................... 455/569.1, 569.2, 455/517, 519, 458, 41.1–41.2, 151.2, 99, 518, 575.2, 575.9, 151.1; 340/428, 686.1, 687, 686.6; 379/88.11–88.13

(56) References Cited

U.S. PATENT DOCUMENTS

| | | | | |
|---|---|---|---|---|
| 5,771,438 A | * | 6/1998 | Palermo et al. ............. | 455/41.1 |
| 5,982,904 A | * | 11/1999 | Eghtesadi et al. ......... | 455/90.2 |
| 6,108,567 A | * | 8/2000 | Hosonuma ................ | 455/569.2 |
| 6,154,663 A | * | 11/2000 | Itamochi .................. | 455/569.2 |
| 6,230,029 B1 | * | 5/2001 | Hahn et al. ............... | 455/575.2 |
| 6,405,027 B1 | * | 6/2002 | Bell ........................... | 455/403 |
| 6,459,882 B1 | * | 10/2002 | Palermo et al. ............ | 455/41.1 |
| 6,532,374 B1 | * | 3/2003 | Chennakeshu et al. .. | 455/569.1 |
| 6,574,455 B2 | * | 6/2003 | Jakobsson et al. ......... | 455/41.2 |

\* cited by examiner

Primary Examiner—William Trost
Assistant Examiner—Joseph D Nguyen
(74) Attorney, Agent, or Firm—Antonelli, Terry, Stout & Kraus, LLP

(57) ABSTRACT

A hands-free unit of a system automatically transmits a first paging signal to page a mobile terminal of at least one user of a first category of users and upon receiving a response signal therefrom, connects the hands-free unit to that mobile terminal. If there's no response signal with a first predetermined time period, a second paging signal is transmitted to page at least one of a second category of users and upon receiving a response signal connects the hands-free unit to that mobile terminal. If there's no response signal with a second predetermined time period, the system awaits a signal from one user of third category of users and upon receiving a signal therefrom, connects the hands-free unit to that mobile terminal.

23 Claims, 3 Drawing Sheets

HANDS-FREE OPERATION OF MOBILE TERMINAL USING WIRELESS COMMUNICATION LINK

BACKGROUND OF THE INVENTION

1. Field of the Invention

The present invention relates to a technique for allowing hands-free operation of a mobile terminal using a wireless communication link. More particularly, the present invention relates to a technique for allowing hands-free operation of a mobile telephone in a vehicle utilizing a low-power wireless communication link, such as the Bluetooth System, to connect the mobile telephone to the hands-free device disposed within the vehicle.

2. Description of the Related Art

In the past, in order to allow the hands-free operation of a mobile telephone in a vehicle, it is been necessary to physically place the mobile telephone in some sort of cradle which electrically connects the hands-free device to the mobile telephone. This creates difficulties in that the telephone user must extract the mobile telephone from his or her briefcase or pocket or handbag and place the mobile telephone in the cradle of the hands-free device in order to operate the mobile telephone.

Because of the difficulties noted above, at present, hands-free devices are not widely used and accordingly, most drivers of vehicles operate their mobile telephones as handheld devices. It has been written that the distraction caused by operating a handheld mobile telephone is conservatively estimated as causing 150,000 traffic accidents each year in the United States. In view of this, is been written that 35 state legislatures are considering laws that would curb handheld mobile telephone use while driving, according to the National Conference of State Legislatures. Furthermore, other countries have started to pass laws prohibiting the use of handheld mobile telephones while driving.

The latest generation of mobile telephones are being equipped with low-power wireless communication devices, such as those of the Bluetooth System, which enable them to communicate over short distances, for example, 10 meters, with other similarly equipped electronic devices.

Using this technology, the Parrot Company announced that they had developed a wireless arrangement which would allow hands-free operation of a mobile device in a vehicle utilizing the Bluetooth System. While the Parrot arrangement is an improvement over the use of a cradle type hands-free device, its operation appears to be limited to three mobile telephones according to Parrot's brief announcement.

SUMMARY OF THE INVENTION

Accordingly, an object of the present invention is to provide a technique for connecting a hands-free unit of a system to a mobile terminal of a user which, upon an ignition switch being turned on, automatically transmits a first paging signal to page a mobile terminal of at least one user of a first category of users. Upon the wireless communications unit of the system receiving a response signal transmitted by the mobile terminal of the least one user of the first category of users, the system wirelessly connects the hands-free unit to the mobile terminal transmitting the response signal. Alternatively, upon the wireless communications unit not receiving a response signal in response to the first paging signal within a first predetermined period of time, the wireless communications unit automatically transmits a second paging signal to page a mobile terminal of at least one user of a second category of users and upon the wireless communications unit receiving a response signal transmitted by the mobile terminal of the at least one user of a second category of users in response to the second paging signal, wirelessly connecting the hands-free unit to the mobile terminal transmitting the response signal. Further alternatively, upon the wireless communications unit not receiving a response signal in response to the second paging signal within a second predetermined period of time, the system awaits a signal transmitted by a mobile terminal of at least one user of a third category of users and upon receiving a signal transmitted by the mobile terminal of the at least one user of a third category of users, wirelessly connecting the hands-free unit to the mobile terminal of the at least one user of a third category of users.

BRIEF DESCRIPTION OF THE DRAWINGS

The foregoing and a better understanding of the present invention will become apparent from the following detailed description of an example embodiment and the claims when read in connection with the accompanying drawings, all forming a part of the disclosure of this invention. While the foregoing and following written and illustrated disclosure focuses on disclosing an example embodiment of the invention, it should be clearly understood that the same is by way of illustration and example only and that the invention is not limited thereto. The spirit and scope of the present invention are limited only by the terms of the appended claims.

The following represents brief descriptions of the drawings, wherein.

DETAILED DESCRIPTION

Figure 1:
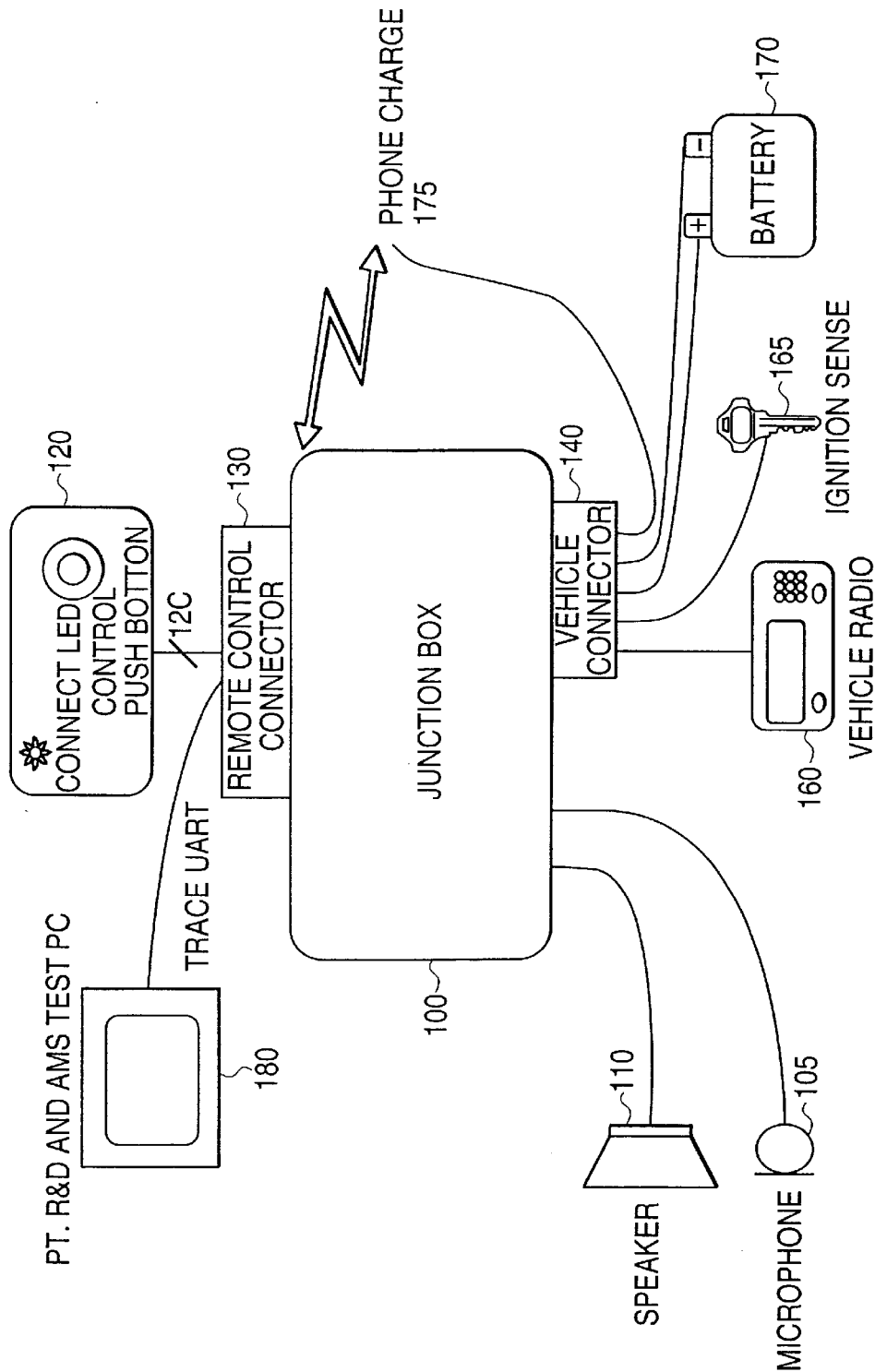
FIG. 1 is a block diagram illustrating an example embodiment of an arrangement in accordance with the present invention.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Well-known elements and connections may not be shown within the drawing figures for simplicity of illustration and discussion and so as not to obscure the invention. Furthermore, arrangements have been shown in block diagram form in order to avoid obscuring the invention and also view of the fact that the specifics with respect to implementation of such block diagram arrangements are dependent upon the platform within which the present invention is to be implemented. That is, such specifics should be well within the purview of one skilled in the art. Where specific details have been set forth in order to describe an example embodiment of the invention, it should be understood to one skilled in the art that the invention can be practiced without or with variations of these specific details. Finally, it should be apparent that differing combinations of hard-wired circuitry and software instructions can be used to implement embodiment of the present invention.

That is, the present invention is not limited to any specific combination of hardware and software.

For example, although the example embodiment of the present invention is described below as utilizing the Bluetooth System to wirelessly link the mobile telephone to the hands-free device, is apparent that the invention is not limited thereto.

Furthermore, for the sake of brevity, the specific details of the Bluetooth System have been omitted from the description below. All of the Bluetooth System Specifications and Profiles are available on the Internet at http://www.bluetooth.com and are incorporated by reference herein in their entirety.

FIG. 1 is a block diagram illustrating an example embodiment of an arrangement in accordance with a present invention. As illustrated in FIG. 1, a junction box 100 includes the various elements of the hands-free device enabling hands-free operation of a mobile terminal using a wireless communication link between a hands-free device disposed within the junction box 100 and the mobile terminal. A remote control connector 130 allows the junction box 100 to be connected to a test PC 180, for example, to test the functions of the junction box 100. Furthermore, the remote control connector 130 allows the connection of a remote control 120 to the junction box 100. The remote control 120 would normally be disposed in the motor vehicle at a location both visible and accessible to the driver and may include one or more indicator lights and one or more controls and/or push buttons. The junction box 100, the other hand, need not be located in plain view but rather may be located under the vehicle dashboard or in the vehicle trunk.

A speaker 110 and a microphone 105 are both connected via connectors to the junction box 100 and allow for hands-free operation of the mobile telephone. The speaker 110 may either be the speaker normally used for the vehicle radio or may instead be specifically provided solely for use with the hands-free arrangement. The microphone 105 is disposed at a location in the vehicle suitable for picking up the speech of the driver-user.

A vehicle connector 140 allows the junction box 100 to be connected to the vehicle radio 160 so as to provide muting of the vehicle radio 160 during a telephone call. The vehicle connector 140 also allows the vehicle battery 170 to be connected to the junction box 100 to provide power thereto. Still furthermore, the vehicle connector 140 allows the junction box 100 to be connected to an ignition sense connection 165 to provide a signal to the junction box 100 upon the ignition of the vehicle being turned on. Lastly, the vehicle connector 140 also allows the junction box 100 to be connected to a phone charge connection 175 to provide charging voltage to an optional cradle disposed within the vehicle to allow a battery of a mobile telephone to be charged. It is of course understood that the phone charge connection 175 and the connection to the vehicle radio 160 to allow muting are optional and not necessary for the operation of the present invention.

Figure 2:
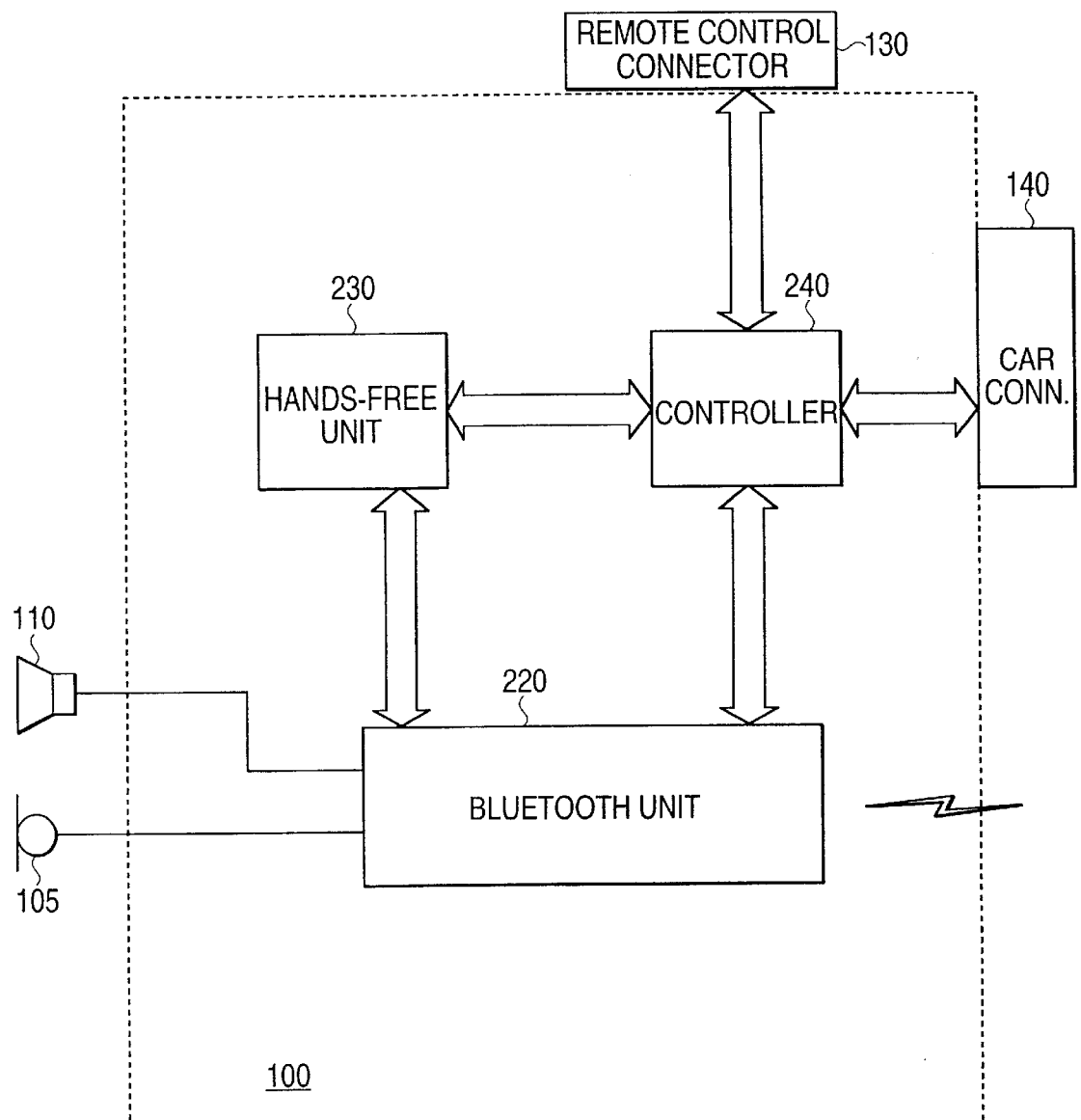
FIG. 2 is a block diagram illustrating in detail an example of the junction box 100 of FIG. 1.

FIG. 2 is a block diagram illustrating in detail an example of the junction box 100 of FIG. 1. Referring to FIG. 2, the junction box 100 includes a Bluetooth unit 220, a hands-free unit 230, and a controller 240. These three units together control the hands-free operation of the mobile telephone as will be discussed in detail below. It is of course understood that while these units are illustrated as being separate units, one or more of these units may in fact be combined to reduce the size and cost and complexity of the junction box 100.

Figure 3:
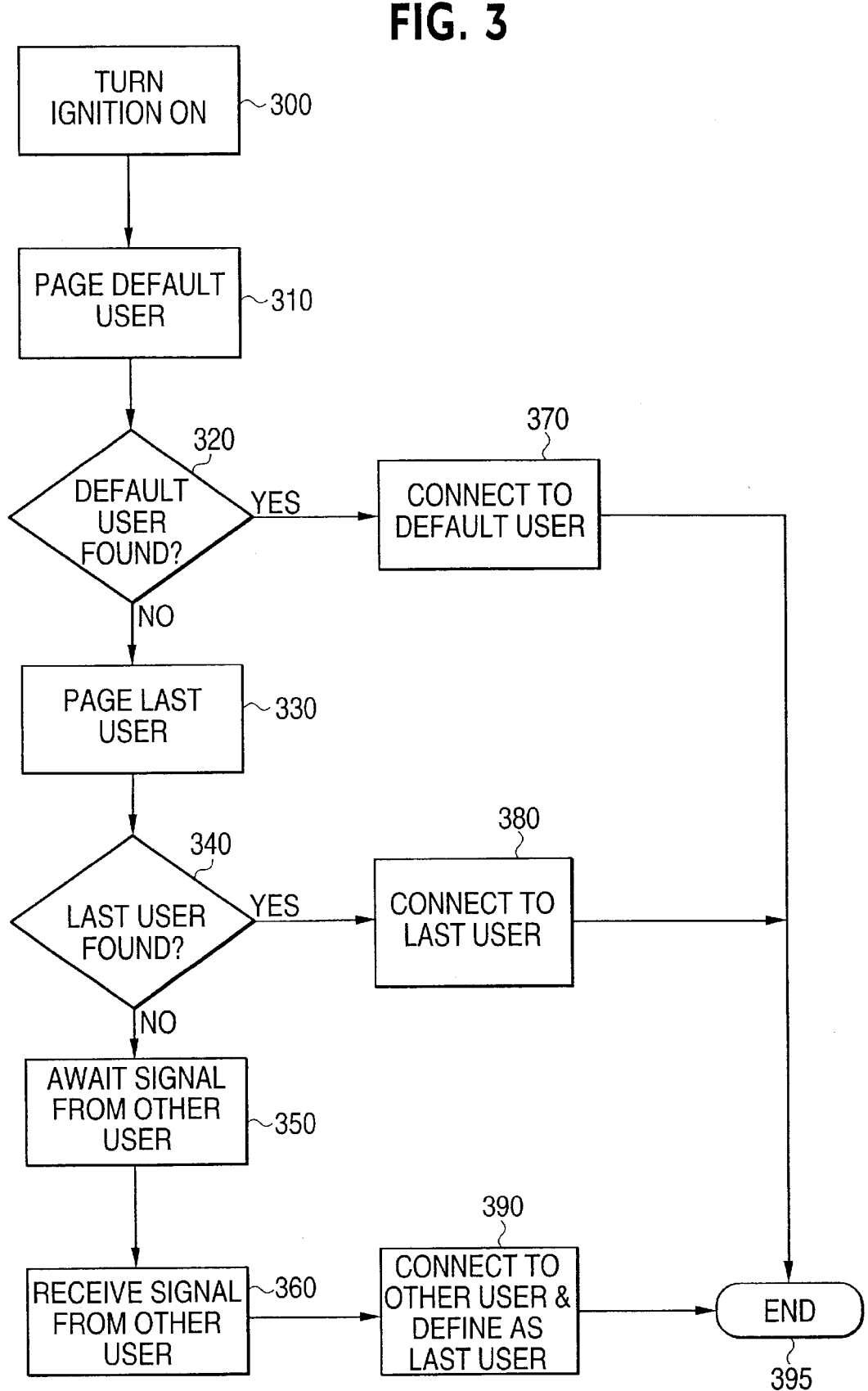
FIG. 3 is a flowchart illustrating an example of the steps of the technique of the present invention.

FIG. 3 is a flowchart illustrating an example of the steps of the technique of the present invention. Referring to FIGS. 1–3, initially, in step 300 of FIG. 3, upon a driver turning the ignition on, the ignition sense connection 165 provides a signal via the vehicle connector 140 to the junction box 100 and thence to the controller 240 therein. The controller 240, upon receiving the ignition sense signal, controls the hands-free unit 230 and Bluetooth unit 220 to attempt to set up a wireless communication link between the hands-free unit 230 and a mobile terminal of the driver-user utilizing the Bluetooth unit 220.

Basically, in the present invention, differing users are separated into different classifications, namely, a default user, a last user, and a user, for example. Before receiving any user classification, the user device must be paired, (that is, bonded), with the junction box 100. That is, in the Bluetooth System, the user must know the PIN code of the Bluetooth unit 220 of the junction box 100.

In accordance with the present invention, the default user has several advantages over other users of the other classifications. Most importantly, when the default user enters the vehicle and turns the ignition key on, the Bluetooth unit 220 of the junction box 100 starts paging the current default user as noted in step 310 of FIG. 3. If the default user is found as noted in step 320 of FIG. 3, the Bluetooth unit 220 of the junction box 100 automatically connects the hands-free unit 230 to the user's mobile telephone to enable the default user to make or receive telephone calls using the hands-free unit 230 without removing his or her mobile telephone from his briefcase or handbag or pocket.

The default user is the first person who has paired with the hands-free device after factory set up. That is, when the user has purchased a new hands-free unit and starts preparing to make a first connection to it, then that user becomes the default user after a successful first connection attempt, (PIN code OK, authentication OK, etc.). The original default user remains the default user as long as the device operates. The device may be arranged to create a new default user by placing the hands-free device in the factory set up mode. This mode may be activated by disconnecting the cable of the microphone 105 from the hands-free device and then connecting back within five seconds, for example. Such a user operation may be used to dear the connection databases and set up the factory set up mode. After such a set up mode is achieved, there is no default user or last user and new pairings must be performed to designate the default user and last user.

Furthermore, the default user also has an additional capability with regard to the hands-free device. Namely, only the default user can change the PIN code of the hands-free device and only the default user can change the so-called Bluetooth remote name of the hands-free device. Normally, the Bluetooth System does not support remote name changes or remote PIN code changes but it can be changed by using manufacturer specified AT commands.

Returning to the flowchart of FIG. 3, if a default user is found in step 320, that is, if a default user responds to the default user page of step 310, then the hands-free device is automatically connected to the default user in step 370, thereby allowing the default user to make or receive telephone calls utilizing the hands-free device which is now connected via the Bluetooth System communication link to the mobile telephone of the user.

On the other hand, in the absence of a response to the default user page of step 310, the last user is paged in step 330. The last user is a user who has operated the hands-free device last. The mobile telephone of the last user will be automatically connected to the hands-free device when there is no default user in the vehicle and the Bluetooth System link to the hands-free device is free (that is, not connected to any other device). The default user is paged for a predetermined period of time in step 310 (for example, two to five seconds) and if there is no response, the last user is paged in step 330.

If the last user is found in step 340, that is, if the last user responds to the last user page of step 330, then the mobile telephone of the last user is connected to the hands-free device via the Bluetooth System link as noted in step 380.

In the absence of the last user being found in step 340, the hands-free device remains in a standby state awaiting a signal from any other user as noted in step 350. Such any other users only have manual access capability to the hands-free device. That is, such other users must manually enter and transmit data with their mobile telephone to the hands-free device in order to establish a Bluetooth System communication link between the mobile telephone and the hands-free device.

Upon receiving such a signal from an other user as noted in step 360, the hands-free device is connected to the mobile telephone of the other user and is defined as the last user as noted in step 390 and the previous last user is defined as a user.

Step 395 merely indicates that process ends with the hands-free device being connected to a user's mobile telephone.

Upon establishing a connection with the hands-free device, such an other user becomes the last user and the mobile telephone of the last user now may automatically connect to the hands-free device in the absence of the default user.

The following is a brief description of one usage scenario of such a system as noted above. First assume that there is a family with a father and mother and one or more children. The father purchases the above noted hands-free device and installs it in the family car. Initially, the hands-free device is in the factory set up mode. The father turns the ignition key to the on position, thereby placing the device in the inquiry scan mode in which it awaits a signal from a nearby mobile telephone. The father attempts to manually make a connection with his mobile telephone having Bluetooth System capability. The father is prompted by his mobile telephone to enter a PIN code to make the connection. The literature that came with the hands-free device includes the required PIN code which is then entered manually by the father on his mobile telephone. A first pairing and connection is then made via the Bluetooth System and the hands-free device as well as the father's mobile telephone store various data such that the mobile telephone of the father is now stored as the default user and so that the PIN code does not have to be manually entered by the father again in order to connect to the hands-free device.

Upon the father leaving the family car, the ignition key is turnoff and the hands-free device is disconnected and goes into a power saving mode. The next time the father enters the family car and turns the ignition key on, the hands-free device is automatically connected to the mobile telephone of the father.

Now assume that the mother also needs to use the same family car and hands-free device. Initially, the father shows the mother how to pair her mobile telephone with the hands-free device. The father must first turnoff his own mobile telephone since the hands-free device cannot operate with other devices if the default user mobile telephone is present. The hands-free device first tries to page the default user (father) but since the father's mobile telephone has been turned off, the hands-free device returns to the inquiry scan mode and waits for other devices to signal it. The mother then performs the same procedure as the father did initially, thereby resulting in a second pairing and connection between the mother's mobile telephone and the hands-free device. As before, both the mobile telephone of the mother and the hands-free device store the connection information and the mother's mobile telephone is designated the last user. Now, every time that the mother enters the family car and turns the ignition key, her mobile telephone will be automatically connected via the Bluetooth System link to the hands-free device as long as the father's mobile telephone is not nearby. If the mother is in the family car and drives to the bus stop to pickup the father, the father will find that he is unable to connect his mobile telephone to the hands-free device as long as the mother's mobile telephone is connected to the hands-free device since the hands-free device can only be connected via the Bluetooth System link to one mobile telephone.

The hands-free device is now programmed such that if both mother and father turn off the ignition and leave the car and then both return to the car later and turn the ignition on, the father's mobile telephone will be connected via the Bluetooth System link to the hands-free device rather than the mother's mobile telephone being connected to the hands-free device.

If the mother and father have a daughter who also drives the family car and also has her own mobile telephone, she must follow the same procedure that her mother initially used to manually enter the required information to connect her mobile telephone via the Bluetooth System link to the hands-free device. Upon doing so, the hands-free device now considers the daughter's mobile telephone to be the last user rather than the mother's mobile telephone.

Upon both the mother and daughter entering the family car and turning the ignition key on, the hands-free device will be connected to the mobile telephone of the user who is designated the last user. Accordingly, if the daughter is now designated the last user, then it will be necessary for the mother to enter the required information manually on her mobile telephone in order to again become designated the last user (presuming that the daughter's mobile telephone is not nearby).

In the above noted description, it is presumed that there is only one default user and only one last user and a third classification of other users. It is of course understood that the present invention is not limited thereto. That is, it is possible to envision a hands-free device arrangement in which there is more than one default user or more than one last user or in fact more than just three classifications of users.

It is to be noted that in the previous description, it is been presumed that all of the mobile telephones operating with the hands-free device have their low-power wireless communication link (that is, Bluetooth System link, for example) in the automatic mode. However, it is possible in some mobile telephones to select a manual mode for the Bluetooth system link. If the default user has chosen the manual connection mode in his or her mobile telephone and then turns the ignition key on, the hands-free device begins its paging procedure to page the default user and the default user will then have a prompt displayed on the screen of his or her mobile telephone asking whether or not the user wishes to be connected to the hands-free device. If so, then the user responds to the prompt and a connection takes place as noted above for the automatic mode case. On the other hand, if the default user does not wish to be connected to the hands-free device, then the hands-free device begins to page the last user. In a similar fashion, the last user may also have this same automatic/manual mode switching capability. Lastly, if a user is paged in the manual mode and does not respond within a predetermined period of time, then the hands-free device presumes that the user does not wish to be connected to the hands-free device and the hands-free device then continues its programmed procedure.

This concludes the description of the example embodiment. Although the present invention has been described with reference to an illustrative embodiment thereof, it should be understood that numerous other modifications and embodiments can be devised by those skilled the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled the art.

For example, as noted previously, the present invention is not limited to Bluetooth System communication links nor is it limited to just three classifications of users nor is it limited to just one default user or just one last user. Furthermore, while mobile telephones have been referred to in the illustrative example above, the present invention is not limited thereto but rather may include other electronic devices such as laptop computers having voice recognition capabilities, for example.

What is claimed is:

1. A method of connecting a hands-free unit to a mobile terminal of a user, the method comprising:
   providing a hands-free unit to receive audible sounds from the user and to transmit audible sounds to the user;
   providing a wireless communications unit to wirelessly connect the hands-free unit to the mobile terminal; and
   providing an input to receive a start process signal;
   wherein, upon said input receiving said start process signal, said wireless communications unit automatically transmitting a first paging signal to page a mobile terminal of at least one user of a first category of users and upon said wireless communications unit receiving a response signal transmitted by the mobile terminal of said at least one user of a first category of users in response to said first paging signal, wirelessly connecting said hands-free unit to the mobile terminal transmitting the response signal and alternatively, upon said wireless communications unit not receiving a response signal in response to said first paging signal within a first predetermined period of time, said wireless communications unit automatically transmitting a second paging signal to page a mobile terminal of at least one user of a second category of users and upon said wireless communications unit receiving a response signal transmitted by the mobile terminal of said at least one user of a second category of users in response to the second paging signal, wirelessly connecting said hands-free unit to the mobile terminal transmitting the response signal and alternatively, upon said wireless communications unit not receiving a response signal in response to the second paging signal within a second predetermined period of time, awaiting a signal transmitted by a mobile terminal of at least one user of a third category of users and upon receiving a signal transmitted by the mobile terminal of said at least one user of a third category of users, wirelessly connecting said hands-free unit to the mobile terminal of said at least one user of a third category of users.

2. The method of claim 1, further comprising disposing the provided hands-free unit within a vehicle.

3. The method of claim 1, wherein said start process signal comprises a signal indicating that a switch has been turned on.

4. The method of claim 2, wherein said start process signal comprises a signal indicating that an ignition switch of the vehicle has been turned on.

5. The method of claim 1, wherein said first category of users comprises a plurality of default users.

6. The method of claim 1, wherein said first category of users comprises a single default user.

7. The method of claim 1, wherein said second category of users comprises a plurality of last users.

8. The method of claim 1, wherein said second category of users comprises a single last user.

9. The method of claim 1, wherein said third category of users comprises a plurality of other users.

10. The method of claim 1, further comprising re-categorizing said at least one user of a third category of users as a user within said second category of users upon receiving a signal transmitted by the mobile terminal of said at least one user of said third category of users.

11. The method of claim 1, wherein said wireless communications unit comprises a Bluetooth System communications unit.

12. The method of claim 1, further comprising prior to awaiting a signal transmitted by a mobile terminal of said at least one user of the third category of users, said wireless communications unit automatically transmitting a third paging signal to page a mobile terminal of at least one user of a fourth category of users and upon said wireless communications unit receiving a response signal transmitted by the mobile terminal of said at least one user of a fourth category of users in response to the third paging signal, wirelessly connecting said hands-free unit to the mobile terminal transmitting the response signal and alternatively, upon said wireless communications unit not receiving a response signal in response to the third paging signal within a third predetermined period of time, the method proceeding to the step of awaiting a signal transmitted by a mobile terminal of said at least one user of the third category of users.

13. A hands-free mobile terminal system for connection to a mobile terminal of a user, the system comprising:
   a hands-free unit to receive audible sounds from the user and to transmit audible sounds to the user;
   a wireless communications unit to wirelessly connect the hands-free unit to the mobile terminal; and
   a controller connected to said hands-free unit and said wireless communications unit to control said hands-free unit and said wireless communications unit, said controller having an input to receive a start process signal;
   wherein, upon said controller receiving said start process signal, said controller causing said wireless communications unit to automatically transmit a first paging signal to page a mobile terminal of at least one user of a first category of users and upon said wireless communications unit receiving a response signal transmitted by the mobile terminal of said at least one user of a first category of users in response to said first paging signal, said controller causing said wireless communications unit to wirelessly connect said hands-free unit to the mobile terminal transmitting the response signal and alternatively, upon said wireless communications unit not receiving a response signal in response to said first paging signal within a first predetermined period of time, said controller causing said wireless communications unit wireless communications unit to automatically transmit a second paging signal to page a mobile terminal of at least one user of a second category of users and upon said wireless communications unit receiving a response signal transmitted by the mobile terminal of said at least one user of a second category of users in response to the second paging signal, said controller causing said wireless communications unit to wirelessly connect said hands-free unit to the mobile terminal transmitting the response signal and alternatively, upon said wireless communications unit not receiving a response signal in response to the second paging signal within a second predetermined period of time, said controller causing said wireless communications unit to await a signal transmitted by a mobile terminal of at least one user of a third category of users and upon said wireless communications unit receiving a signal transmitted by the mobile terminal of said at least one user of a third category of users, said controller causing said wireless communications unit to wirelessly connect said hands-free unit to the mobile terminal of said at least one user of a third category of users.

14. The system of claim 13, further comprising disposing said hands-free unit within a vehicle.

15. The system of claim 14, wherein said start process signal comprises a signal indicating that an ignition switch of the vehicle has been turned on.

16. This system of claim 13, wherein said start process signal comprises a signal indicating that a switch has been turned on.

17. The system of claim 13, wherein said first category of users comprises a plurality of default users.

18. The system of claim 13, wherein said first category of users comprises a single default user.

19. The system of claim 13, wherein said second category of users comprises a plurality of last users.

20. The system of claim 13, wherein said second category of users comprises a single last user.

21. The system of claim 13, further comprising said controller re-categorizing said at least one user of a third category of users as a user within said second category of users upon receiving a signal transmitted by the mobile terminal of said at least one user of said third category of users.

22. The system of claim 13, wherein said wireless communications unit comprises a Bluetooth System communications unit.

23. The system of claim 13, further comprising said controller causing said wireless communications unit, prior to awaiting a signal transmitted by a mobile terminal of said at least one user of the third category of users, to automatically transmit a third paging signal to page a mobile terminal of at least one user of a fourth category of users and upon said wireless communications unit receiving a response signal transmitted by the mobile terminal of said at least one user of a fourth category of users in response to the third paging signal, said controller causing said wireless communications unit to wirelessly connect said hands-free unit to the mobile terminal transmitting the response signal and alternatively, upon said wireless communications unit not receiving a response signal in response to the third paging signal within a third predetermined period of time, said controller proceeding to cause said wireless communications unit to await a signal transmitted by a mobile terminal of said at least one user of the third category of users.

* * * * *